UNITED STATES PATENT OFFICE.

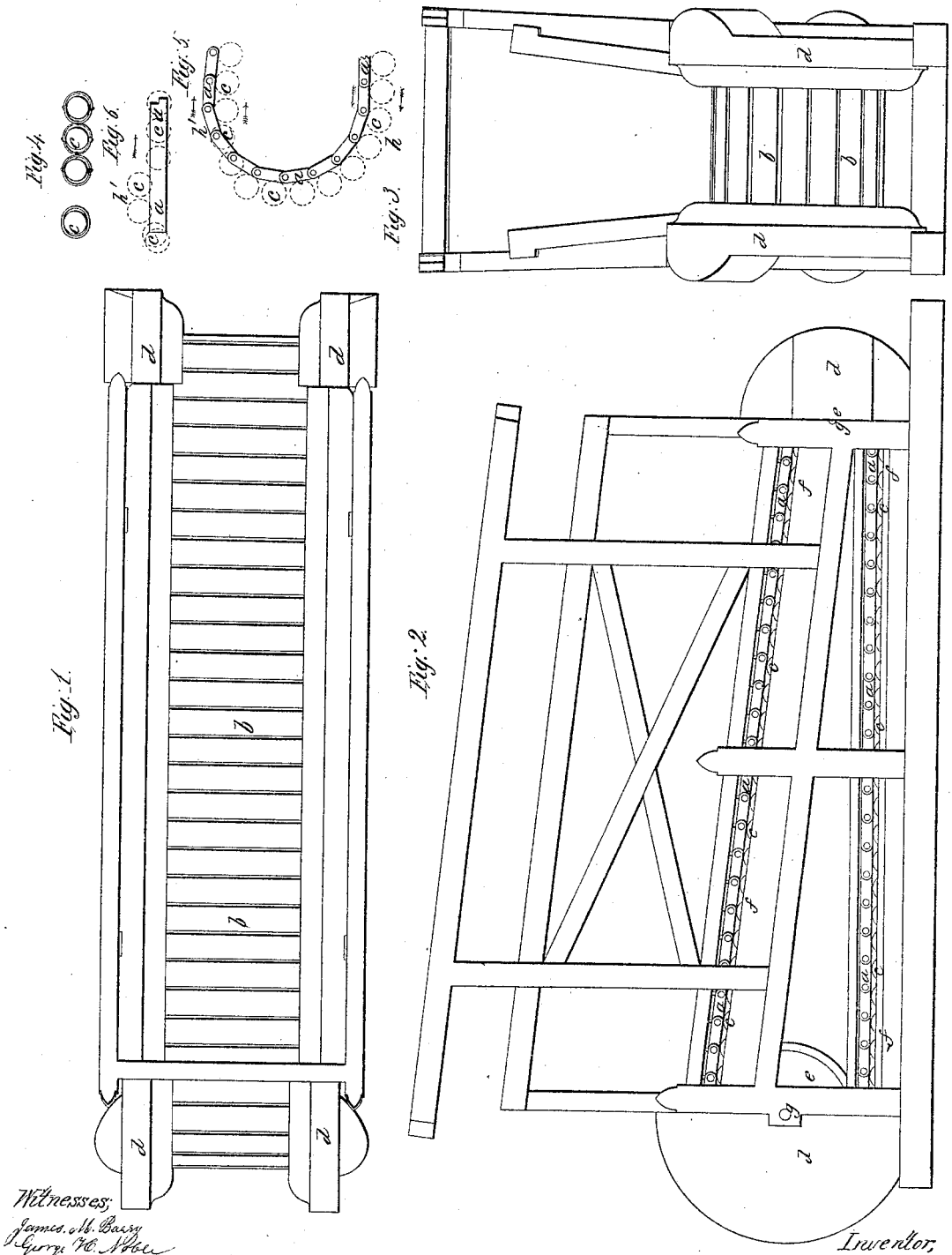

GEORGE E. BURT, OF HARVARD, MASSACHUSETTS.

HORSE-POWER.

Specification of Letters Patent No. 33,028, dated August 13, 1861.

*To all whom it may concern:*

Be it known that I, GEORGE E. BURT, of Harvard, in the county of Worcester and State of Massachusetts, have invented a new and useful Improvement in Endless-Chain Horse-Powers; and I do hereby declare that the following is a full, clear, and exact description thereof, reference being had to the accompanying drawings, making part of this specification, in which—

Figure 1 is a plan, Fig. 2 is a side elevation and Fig. 3 is an end elevation of the machine complete. Fig. 4 is a plan of the balls inclosed in flexible links and guards. Fig. 5 is a side elevation diagram showing the path of the balls in their passage from one straight track to the other. Fig. 6 is a plan diagram showing the same.

The same letters indicate like parts in all the figures.

The object of my invention is to make an endless chain horse power, so that the balls shall support the lower as well as the upper portion of the chain, and to this end my invention consists in combining the chain of the platform with the balls or rolls, by means of end tracks or guides, so formed, that when any link of the chain ceases to roll on the balls or rolls, during its passage from one straight track to another, the balls or rolls shall be guided around the outside of the chain, and under it again, without reversing or stopping their rotatory motion.

In the accompanying drawings $a$ represents the links of the endless platform chain, recessed on the inside to receive the tread $b$, semicircular on the outside to facilitate the passage of the balls or rolls $c$ around it and flat on the top and bottom, to present a proper surface to the supporting rollers or balls.

The partially inclosed end tracks or guides $d$ are made to permit a free movement of the platform on the tension pulleys $e$; and allow the links of the chain to travel in a plane parallel to the straight tracks $f$—the groove for the free passage of the balls or rolls in them, is also made in the same vertical plane in the first half of the guide $h$; but in the last half $h'$, the bottoms of the chain links having become the tops, the groove is made to gradually guide the balls or rolls around the semicircular outside of the chain, and again under it, and on to the straight track. The balls or rolls being kept in constant contact with the chain and guide. The straight tracks $f$ are made with flanges sufficiently high to keep the balls or rolls in their place under the chain.

The tension pulleys $e$ are fastened to the shafts $g$; from which the power may be transmitted as desired.

In this horse power the platform chain moves on and is supported by the peripheries of balls, rolls or wheels, with or without flexible links or guards, which are guided in their proper path by the track upon which they roll, keeping them under the chain on all the straight tracks and as far on the end tracks as the chain will bear on them; then guiding them around the outside of the chain and again under it for its support. The balls rolls or wheels may be guided around the outside of the chain at other parts of the track if desired but the plan shown in the drawing I consider the best.

What I claim as my invention and desire to secure by Letters Patent is—

Conducting independent rolls or an independent chain of rolls from the inside to the outside and from the outside to the inside of the endless platform of horse powers, so that the said rolls shall support both the upper and lower portions of the platform, substantially as hereinbefore explained.

GEORGE E. BURT.

Witnesses:
JAMES M. BARRY,
GEORGE H. NOBLE.